O. C. RITZ-WOLLER.
AIR CONTROL DEVICE FOR LIQUID GAGES.
APPLICATION FILED SEPT. 8, 1913.
1,086,561.  Patented Feb. 10, 1914.
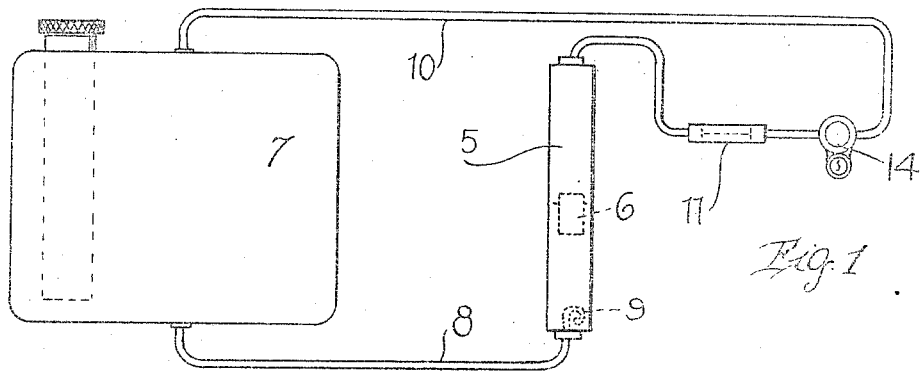
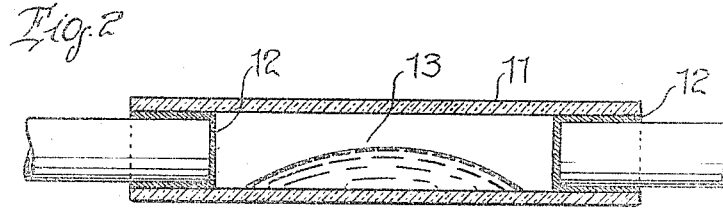
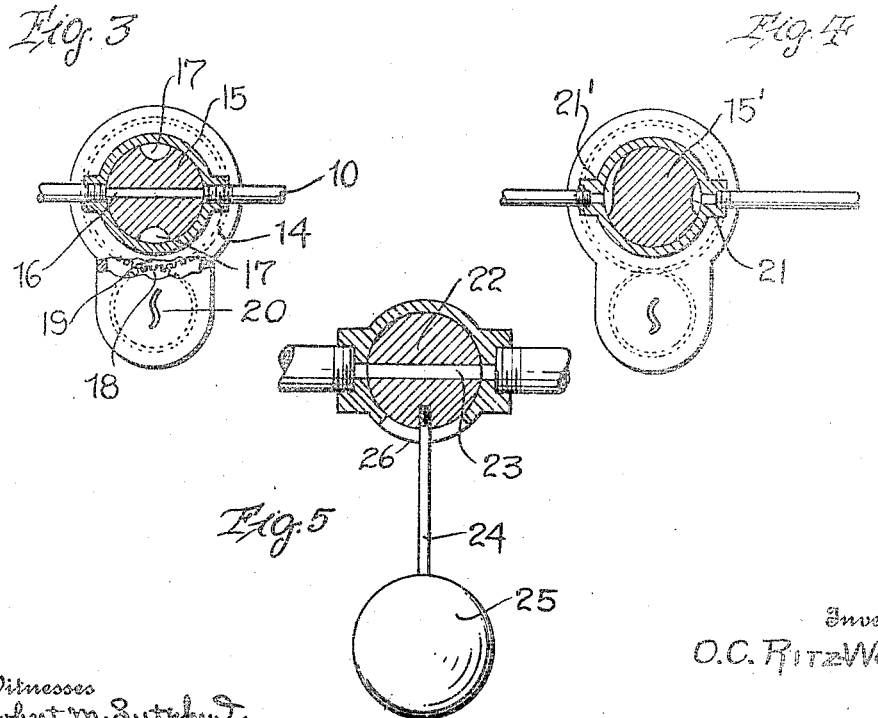
Inventor
O. C. Ritz Woller
Witnesses
Robert M. Sutphen
J. J. Dourick
By Watson E. Coleman
Attorney

UNITED STATES PATENT OFFICE.

OLIVER C. RITZ-WOLLER, OF CHICAGO, ILLINOIS.

AIR-CONTROL DEVICE FOR LIQUID-GAGES.

1,086,561.

Specification of Letters Patent.

Patented Feb. 10, 1914.

Application filed September 8, 1913. Serial No. 788,704.

*To all whom it may concern:*

Be it known that I, OLIVER C. RITZ-WOLLER, citizen of the United States, residing at Chicago, in the county of Cook and State of Illinois, have invented certain new and useful Improvements in Air-Control Devices for Liquid-Gages, of which the following is a specification, reference being had to the accompanying drawings.

This invention relates to improved means for automatically controlling communication between a liquid gage tube and the source of liquid supply and is particularly designed for use in connection with gasolene gages such as are employed upon automobiles, power boats and like vehicles, although not limited to such specific uses.

The invention has for its primary object to provide an improved gravity brake device for pressure or gravity feed gages which will automatically produce an air lock in the connecting pipe between the gage tube and the supply tank when the vehicle ascends or descends an incline, thus preventing any fluctuation in the level of the fluid in the float tube.

Another and more specific object of the invention resides in the provision of an improved gravity controlled brake arranged in the air line pipe between the float tube and the fuel supply tank which will allow of a free passage of the air between the tube and tank when the machine is moving over a level grade but will immediately and automatically cut off communication when the machine ascends or descends an incline, and an additional locking means arranged in the air line pipe whereby the feed of the liquid fuel from the supply tank to the float tube may be cut off and controlled by the operator without necessitating the opening of the tank, said locking device being further designed to permit of the ready escape of the air from the tank and tubing when it is desired to refill the tank.

My invention has for another of its objects to produce a device for the above purpose which is extremely simple in its construction, highly efficient and reliable in practical use and may be manufactured and installed upon pleasure or commercial motor vehicles at a nominal cost.

With the above and other objects in view as will become apparent as the description proceeds, the invention consists in certain construction, combinations and arrangements of the parts that I shall hereinafter fully describe and claim.

For a full understanding of the invention, reference is to be had to the following description and accompanying drawings, in which—

Figure 1 is a side elevation illustrating the assembly of the several parts of my invention; Fig. 2 is an enlarged vertical section through the gravity air brake; Fig. 3 is an enlarged vertical section of the key actuated locking device; Fig. 4 is a similar sectional view of a modified form of said locking device particularly designed for use in connection with a gravity feed tank. Fig. 5 is a detail section illustrating a slightly modified form of the gravity brake.

In the accompanying drawing, I have illustrated a float tube 5 which may be provided or connected with a gage of any preferred type. The float 6 is freely movable in said tube as the quantity of liquid therein varies. The fuel supply tank or reservoir 7 is connected to the lower end of the float tube 5 by the pipe 8, and within the lower end of the float tube and connected to this pipe is a coiled nipple 9. This nipple 9 effectually prevents the exit of the liquid fuel from the float tube by vibration when the automobile or other machine is traveling over rough roads. A length of tubing indicated at 10 connects the top of the fuel tank or reservoir 7 with the upper end of the float tube 5. This air tube intermediate of its ends and preferably adjacent the float tube 5 is provided with a transparent tube section 11 of glass or other material. The spaced ends of the tubing 10 are provided with sleeves of chamois or other material shown at 12 which are penetrable by gasolene or other liquid fuel. These sleeves are inserted into the opposite ends of the transparent tube 11. Within this tube a quantity of quick-silver indicated at 13 is disposed. This body of quick-silver will maintain a central position within the tube 11 when the body of the machine is disposed in a substantially horizontal plane in parallel relation to the road surface. When, however, the machine ascends or descends a grade, the quick-silver 13 will move to one or the other end of the glass tube as the case may be, and against one of the sleeves 12, thereby effectually cutting off the flow of air between the upper ends of the float tube 5 and the tank 7. Thus a vacuum or compression is created so that the feed of the liquid fuel from the tank 7 through the float tube 5 is temporarily suspended. The level of the fuel in the tube and tank is identically the same and will be maintained at this same level until the machine again moves over a level grade surface. The vacuum air lock is then removed and the quick-silver 13 assumes its central position in the glass tube or cylinder 11.

In addition to the gravity brake for automatically cutting off the flow of the fuel under the conditions stated, I have devised a positive key operated cut off valve whereby the flow of the fuel from the tank or reservoir and therefore the use of the car which is provided with the invention is at all times under the control of the operator. This device includes a casing 14 having ports at diametrically opposite points in line with the bore of the air tubing 10. This casing is provided with an internal seat for a rotary valve 15. This valve has a transverse opening 16 which is adapted to register with the ports of the casing 14, so as to provide a communicating passage between the sections of the air tubing 10 and permit of the free flow of air from the upper end of the tank or reservoir 7 into the upper end of the float tube 5. The rotary valve member 15 is further provided at diametrically opposite points with grooves 17 which are open to the atmosphere through one end of the casing 14. The casing 14 is provided with an extension forming a housing for the gear 18 which meshes with a larger gear 19 fixed upon one end of the stem of the valve member 15. The wall of the casing extension is provided with a key slot 20 to receive a key which is adapted for engagement with the gear 18 to rotate the same.

When it is desired to release the air from the tank 7 and the float tube 5 so that the tank may be replenished with fuel, the key is inserted into the casing 14 and the gear 18 is rotated, thereby transmitting rotation to the valve member 15, and disposing the transverse opening 16 thereof out of alinement with the sections of the air tubing 10, and moving the grooves 17 of said valve member into registration therewith. Thus, when the liquid fuel is poured into the tank or reservoir 7, the air may freely escape from the tube 10 and the grooves 17 which are in communication therewith, to the atmosphere. The fuel supply may also be absolutely locked so that it cannot be used by an unauthorized party by simply turning the valve member 15 until the ends of the passage or opening 16 are out of alinement with the bore of the tubing 10, the grooves 17 being also out of communication therewith. Thus communication between the float tube and the tank may be closed when the machine is on a level grade, and if the machine is used without the authorization of the owner, the locking device may be actuated to again establish communication between the tube and the reservoir so that the liquids therein will immediately fall to their proper level.

In Fig. 4 of the drawing, I have shown a slightly modified form of the locking device which is designed for use in connection with gravity feed tanks or reservoirs. The valve member 15′ is actuated in the manner above described, but unlike the preferred form of said locking device, this valve member is not provided with a transverse passage or opening. The valve member 15′ is, however, provided in its periphery with a longitudinal groove or channel 21 and at a diametrically opposite point is provided with a second longitudinal groove or channel 21′ which, however, is of appreciably greater width than the groove 21. Thus by turning the valve member 15′, communication between the float tube and the tank or reservoir may be cut off while at the same time the air space in the upper end of the float tube 5 is open to the atmosphere through the medium of the groove or channel 21′, thus permitting of the free movement of the float member in said tube, when the car ascends or descends an incline. As soon as the operator again turns the valve 15′ to its former position, when the machine reaches the level grade, the liquid in the tube 5 will descend to the same level as that in the tank or reservoir 7.

In Fig. 5 of the drawing, I have shown a slightly modified form of the gravity brake device wherein, in lieu of the quick-silver body 13, I employ a rotary valve member 22 which is arranged in the air tubing 10, said valve member having a transverse opening or passage 23 normally in communication with the bore of the tube. A rod 24 is fixed at its upper end to the valve member 22 and is provided on its lower end with a suitable weight 25. The casing of the valve member 22 is provided with a slot indicated at 26 so that the rod 24 may move freely therein. It will be apparent that when the machine ascends or descends a grade, the valve member 22 will be rotated so as to disaline the opening or passage 23 thereof with the bore of the tube 10.

From the foregoing, it is believed that the construction and manner of operation of my invention will be clearly and fully understood.

The device effectually prevents the flow of the liquid fuel from the supply tank or reservoir to the float tube when the machine ascends or descends an incline so that the level of the fluid in the float tube will not change and the indicating mechanism will not be actuated to wrongly indicate the amount of fuel contained in the supply tank. Thus the level of the fuel will remain the same whether the machine is moving over an incline or level grade.

The device may be constructed at nominal cost and is applicable to motor vehicles, boats, or other vehicles now in common use without necessitating any alteration in their construction whatsoever.

Having thus described the invention, what is claimed is:

1. The combination with a fuel supply tank and a gage tube, of an air line pipe connecting the upper ends of said tank and tube, means arranged in said air line pipe and operable by gravity upon change of relative elevation of tank and tube to close communication through said pipe between the tank and tube, and a pipe connecting the lower ends of said tank and tube.

2. The combination with a fuel supply tank and a float tube, of an air line pipe connecting said tank and float tube at their upper ends, a transparent tube section arranged in said air line pipe, and a gravity movable body arranged in said transparent tube and normally admitting of the free passage of air therethrough between the tank and the float tube, said body being movable into either end of the transparent tube upon change of relative elevation of tank and tube to cut off communication through the air line pipe between the tank and float tube, and a pipe connecting the lower ends of said tank and float tube.

3. The combination with a fuel supply tank and gage float tube for vehicles, of an air line pipe connecting the upper ends of said tank and tube, means interposed in said air line pipe to automatically cut off communication between the tank and float tube upon change of relative elevation of tank and tube, and a pipe connecting the lower ends of said tank and float tube.

4. The combination with a fuel supply tank and gage float tube for vehicles, of an air line pipe connecting the upper ends of said tank and tube, means interposed in said air line pipe to automatically cut off communication between the tank and float tube upon change of relative elevation of tank and tube, a manually operable locking device arranged in the air line pipe for positively closing communication between the upper ends of the tank and float tube, and a pipe connecting the lower ends of said tank and float tube.

5. The combination with a fuel supply tank and gage float tube for vehicles, of an air line pipe connecting the upper ends of said tank and tube, means interposed in said air line pipe to automatically cut off communication between the tank and gage float tube upon change of relative elevation of tank and tube, a manually operable rotary valve member arranged in the air line pipe and provided with a passage to establish communication between the upper end of the gage float tube and the atmosphere, and a pipe connecting the lower end of said tank and gage float tube.

6. The combination with a fuel supply tank and gage float tube for vehicles, of an air line pipe connecting the upper ends of said tank and tube, means interposed in said air line pipe to automatically cut off communication between the tank and the gage float tube upon change of relative elevation of tank and tube, a manually operable rotary valve member arranged in the air line pipe and provided with a transverse opening through which communication is established between the upper ends of the tank and tube, said valve member being also provided with additional passages for establishing communication between the tank and gage float tube and the atmosphere, and a pipe connecting the lower ends of said tank and gage float tube.

In testimony whereof I hereunto affix my signature in the presence of two witnesses.

OLIVER C. RITZ-WOLLER.

Witnesses:
R. J. BARRY,
R. C. LITTLE.